(12) United States Patent
Lu (10) Patent No.: US 9,430,444 B2
(45) Date of Patent: *Aug. 30, 2016

(54) ITERATIVELY CALCULATING STANDARD DEVIATION FOR STREAMED DATA

(71) Applicant: Microsoft Technology Licensing, LLC, Redmond, WA (US)

(72) Inventor: Jizhu Lu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,984

(22) Filed: May 26, 2015

(65) Prior Publication Data

US 2015/0278159 A1  Oct. 1, 2015

Related U.S. Application Data

(63) Continuation of application No. 13/711,624, filed on Dec. 12, 2012, now Pat. No. 9,069,726.

(51) Int. Cl.
*G06F 17/18* (2006.01)
*H04L 29/06* (2006.01)

(52) U.S. Cl.
CPC ............... *G06F 17/18* (2013.01); *H04L 65/60* (2013.01)

(58) Field of Classification Search
None
See application file for complete search history.

(56) References Cited

U.S. PATENT DOCUMENTS

| | | |
|---|---|---|
| 7,561,082 B2 | 7/2009 | Vaithianathan |
| 7,751,909 B2 | 7/2010 | Ramsey et al. |
| 7,840,377 B2 | 11/2010 | Ramsey et al. |
| 7,849,227 B2 | 12/2010 | Kashiyama et al. |
| 7,868,886 B2 | 1/2011 | Ackermans et al. |
| 8,086,655 B2 | 12/2011 | Yu et al. |
| 8,185,348 B2 | 5/2012 | Shan et al. |
| 2005/0071402 A1 | 3/2005 | Youn |

(Continued)

FOREIGN PATENT DOCUMENTS

EP   0357842 B1   4/1995

OTHER PUBLICATIONS

Heinz, et al., "Towards Kernel Density Estimation over Streaming Data", Retrieved at <<http://www.cse.iitb.ac.in/comad/2006/proceedings/80.pdf>>, 13th International Conference on Management of Data, Dec. 14, 2006, pp. 12.

"International Search Report & Written Opinion for PCT Patent Application No. PCT/US2013/074478", Mailed Date: Jul. 23, 2014, Filed Date: Dec. 11, 2013, 10 Pages.

(Continued)

*Primary Examiner* — Michael D Yaary
(74) *Attorney, Agent, or Firm* — Nicholas Chen; Kate Drakos; Micky Minhas (57) ABSTRACT

The present invention extends to methods, systems, and computer program products for iteratively calculating standard deviation for streamed data. Embodiments of the invention include iteratively calculating standard deviation in a current computation window based on the standard deviation calculation for a previous computation window. Iteratively calculating standard deviation avoids visiting all previous input and performing redundant computations thereby increasing calculation efficiency. In general, streaming data is added to a buffer of size n until the buffer is filled up. Once the buffer is filled, a sum and standard deviation are calculated for the first n data points. As new data elements are received, a new sum is calculated by reusing the prior sum and a new standard deviation is calculated by reusing the prior standard deviation.

20 Claims, 11 Drawing Sheets

(56) References Cited

U.S. PATENT DOCUMENTS

2005/0256916 A1  11/2005  Srinivasan et al.
2010/0217886 A1   8/2010  Seren et al.

OTHER PUBLICATIONS

Zhu, et al., "StatStream: Statistical Monitoring of Thousands of Data Streams in Real Time", In Proceedings of the 28th international conference on Very Large Data Bases, Aug. 20, 2002, 12 Pages.

Matschullat, et al., "Geochemical Background—Can We Calculate it?", In Environmental Geology, vol. 39, Issue 9, Jul. 2000, pp. 990-1000.

Ding, et al., "Short-Window Spectral Analysis of Cortical Event-Related Potentials by Adaptive Multivariate Autoregressive Modeling:Data Preprocessing, Model Validation, and Variability Assessment", In Biological Cybernecics, vol. 83, Issue 1, Jun. 2000, pp. 35-45.

"Non Final Office Action", Mailing Date: Oct. 15, 2014, U.S. Appl. No. 13/711,624, pp. 5.

The definition of Sample Standard Deviation is:

$$STDDEV.S_n = \sqrt[2]{\frac{1}{n-1}\sum_1^n(x_i - \bar{x})^2} \qquad 401$$

Now, suppose we have a time series of data:

$x_1, x_2, x_3, x_4, \ldots, x_n, x_{n+1}, \ldots$

At time point $n$ we get data $x_n$, and at time point $n+1$ we get data $x_{n+1}$. And, we want to calculate the Standard Deviation of the data within a time window length $n$ whenever a new data is coming.

$$S_n = x_1 + x_2 + x_3 + \ldots + x_n = \sum_1^n x_i \qquad 402$$

$$S_{n+1} = x_2 + x_3 + \ldots + x_n + x_{n+1} = \sum_2^{n+1} x_i \qquad 403$$

So, $S_{n+1}$ can be easily calculated in an iterative way:

$$S_{n+1} = S_n + x_{n+1} - x_1 \qquad 404$$

$$STDDEV.S_{n+1} = \sqrt[2]{STDDEV.S_n^2 + \underbrace{\frac{(x_{n+1}-x_1)}{(n-1)}((x_1+x_{n+1}) - \frac{1}{n}(S_n + S_{n+1}))}_{405A}} \qquad 405$$

Formula 404 can be used for iteratively calculating the SUM within a window length $n$, and formula 405 can be used for iteratively calculating the Sample Standard Deviation within a window length $n$.

*Fig. 4A*

The definition of Standard Deviation for entire population is:

$$STDDEV.P_n = \sqrt[2]{\frac{1}{n}\sum_1^n (x_i - \bar{x})^2} \quad \text{406}$$

We can determine the iterative algorithm for Population Standard Deviation by replacing the denominator ($n$ -1) with $n$:

$$STDDEV.P_{n+1} = \sqrt[2]{STDDEV.P_n^2 + \frac{(x_{n+1} - x_1)}{n}((x_1 + x_{n+1}) - \frac{1}{n}(S_n + S_{n+1}))}$$

Number sequence 501: 3,1,5,6,2,7,8,9,10,4,11,54,-38, ...

Window Length 502: 10

Window 503: {3,1,5,6,2,7,8,9,10,4}, and $x_1 = 3, x_2 = 1, x_3 = 5, ..., x_{10} = 4, x_{11} = 11$ Calculate Standard Deviation For Window 503

1. Calculate the average of the first 10 numbers
$$\bar{x} = \frac{(3+1+5+6+2+7+8+9+10+4)}{10} = \frac{55}{10} = 5.5$$

Operations in this step: 1 division, 9 additions.

2. Calculate $\frac{1}{n-1}\sum_{1}^{n}(x_i - \bar{x})^2$ $$\frac{1}{10-1}\sum_{1}^{10}(x_i - \bar{x})^2$$

$$= \frac{1}{9}((3-5.5)^2 + (1-5.5)^2 + (5-5.5)^2 + (6-5.5)^2 + (2-5.5)^2$$

$$+ (7-5.5)^2 + (8-5.5)^2 + (9-5.5)^2 + (10-5.5)^2 + (4-5.5)^2)$$

$$= \frac{1}{9}(6.25 + 20.25 + 0.25 + 0.25 + 12.25 + 2.25 + 6.25 + 12.25 + 20.25$$

$$+ 2.25) = \frac{82.5}{9} = 9.166666666666667$$

Operations in this step: 1 division, 10 multiplications, 11 subtractions, 9 additions.

*Fig. 5A*

3. Calculate the sample standard deviation $$STDDEV.S_{10} = \sqrt[2]{\frac{1}{10-1}\sum_{1}^{10}(x_i - \bar{x})^2} = \sqrt[2]{9.166666666666667}$$

$$= 3.027650354097492$$

Operations in this step: 1 square root.

So, totally there are 1 square root, 2 divisions, 10 multiplications, 10 subtractions and 18 additions.

The same formulas can be used to calculate standard deviation for:

Window 504: {1,5,6,2,7,8,9,10,4,11}, and $x_1 = 1, x_2 = 5, x_3 = 6, ..., x_{10} = 11, x_{11} = 54$.

For which there are also 1 square root, 2 divisions, 10 multiplications, 10 subtractions and 18 additions.

And to calculate the standard deviation for:

Window 505: {5,6,2,7,8,9,10,4,54}, and $x_1 = 5, x_2 = 6, x_3 = 2, ..., x_{10} = 54, x_{11} = -38$.

For which there are also 1 square root, 2 divisions, 10 multiplications, 10 subtractions and 18 additions.

Fig. 5A (Cont'd)

Number sequence 501: 3,1,5,6,2,7,8,9,10,4,11,54,-38, ...

Window Length 502: 10

Window 503: {3,1,5,6,2,7,8,9,10,4}, and $x_1 = 3, x_2 = 1, x_3 = 5, ..., x_{10} = 4, x_{11} = 11$ Calculate Standard Deviation For Window 503

1. Calculate $S_{10} = x_1 + x_2 + x_3 + ... + x_n = \sum_1^n x_i = 3 + 1 + 5 + 6 + 2 + 7 + 8 + 9 + 10 + 4 = 55$ 2. Calculate $\bar{x} = \frac{S_{10}}{10} = \frac{55}{10} = 5.5$ 3. Calculate $\frac{1}{n-1}\sum_1^n (x_i - \bar{x})^2$ $$\frac{1}{10-1}\sum_1^{10} (x_i - \bar{x})^2$$

$$= \frac{1}{9}((3-5.5)^2 + (1-5.5)^2 + (5-5.5)^2 + (6-5.5)^2 + (2-5.5)^2$$

$$+ (7-5.5)^2 + (8-5.5)^2 + (9-5.5)^2 + (10-5.5)^2 + (4-5.5)^2)$$

$$= \frac{1}{9}(6.25 + 20.25 + 0.25 + 0.25 + 12.25 + 2.25 + 6.25 + 12.25 + 20.25$$

$$+ 2.25) = \frac{82.5}{9} = 9.166666666666667$$

4. Calculate the sample standard deviation $$STDDEV.S_{10} = \sqrt[2]{\frac{1}{10-1}\sum_1^{10}(x_i - \bar{x})^2} = \sqrt[2]{9.166666666666667}$$

$$= 3.027650354097492$$

So, totally there are 1 square root, 2 divisions, 10 multiplications, 10 subtractions and 18 additions.

Fig. 5B

Formulas 404 and 405 can be used to calculate the sample standard deviation in the second window, which is to calculate the standard deviation on numbers: 1,5,6,2,7,8,9,10,4,11, and $x_1 = 3, x_2 = 1, x_3 = 5, \ldots, x_{10} = 4, x_{11} = 11$. (Window 504)

1. Use formula 404 to calculate $S_{11}$
$$S_{11} = S_{10} + x_{11} - x_1 = 55 + 11 - 3 = 63$$
Operations in step 1: 1 addition, 1 subtraction 2. Use formula 405 to calculate the sample standard deviation $$STDDEV.S_{11} = \sqrt[2]{STDDEV.S_{10}^2 + \frac{(x_{11} - x_1)}{(10-1)}((x_1 + x_{11}) - \frac{1}{10}(S_{10} + S_{11}))}$$

$$= \sqrt[2]{3.0276503540974922^2 + \frac{(11-3)}{(10-1)}((3+11) - \frac{1}{10}(55+63))}$$

$$= \sqrt[2]{9.166666666666668 + \frac{8}{9}(14 - \frac{1}{10} * 118)}$$

$$= \sqrt[2]{9.166666666666668 + \frac{8}{9}(14 - 11.8)}$$

$$= \sqrt[2]{9.166666666666668 + \frac{8}{9} * 2.2} = \sqrt[2]{9.166666666666668 + \frac{17.6}{9}}$$

$$= \sqrt[2]{9.166666666666668 + 1.955555555555556}$$

$$= \sqrt[2]{11.12222222222222} = 3.334999583541537$$

Operations in step 2: 1 square root, 2 divisions, 3 multiplications, 3 subtractions and 3 additions. The total operations for calculating the sample standard deviation in the second window are: 1 square root, 2 divisions, 3 multiplications, 4 subtractions and 4 additions.

Fig. 5B (Cont'd)

Formulas 404 and 405 can be used to calculate the sample standard deviation in the third window, which is to calculate the standard deviation on numbers: 5,6,2,7,8,9,10,4,11,54, and $x_1 = 1, x_2 = 5, x_3 = 6, \ldots, x_{10} = 11, x_{11} = 54$. (Window 505)

1. Use formula 404 to calculate $S_{11}$
$$S_{11} = S_{10} + x_{11} - x_1 = 63 + 54 - 1 = 116$$
Operations in step 1: 1 addition, 1 subtraction 2. Use formula 405 to calculate the sample standard deviation $$STDDEV.S_{12} = \sqrt[2]{STDDEV.S_{11}^2 + \frac{(x_{11} - x_1)}{(10 - 1)}((x_1 + x_{11}) - \frac{1}{10}(S_{10} + S_{11}))}$$

$$= \sqrt[2]{3.3349995835415377^2 + \frac{(54 - 1)}{(10 - 1)}((1 + 54) - \frac{1}{10}(63 + 116))}$$

$$= \sqrt[2]{11.12222222222222 + \frac{53}{9}(55 - \frac{1}{10} * 179)}$$

$$= \sqrt[2]{11.12222222222222 + \frac{53}{9}(55 - 17.9)}$$

$$= \sqrt[2]{11.12222222222222 + \frac{53}{9} * 37.1}$$

$$= \sqrt[2]{11.12222222222222 + \frac{1966.3}{9}}$$

$$= \sqrt[2]{11.12222222222222 + 218.4777777777778} = \sqrt[2]{229.6}$$

$$= 15.15255753990065$$

Operations in step 2: 1 square root, 2 divisions, 3 multiplications, 3 subtractions and 3 additions. So the total operations for calculating the sample standard deviation in the third window are: 1 square root, 2 divisions, 3 multiplications, 4 subtractions and 4 additions (i.e., the same as the second window).

*Fig. 5B (Cont'd)*

|  | Square Root | Division | Multiplication | Subtraction | Addition |
|---|---|---|---|---|---|
| Traditional Algorithm | 1 | 2 | 10 | 11 | 18 |
| Iterative Algorithm | 1 | 2 | 3 | 4 | 4 |

|  | Square Root | Division | Multiplication | Subtraction | Addition |
|---|---|---|---|---|---|
| Traditional Algorithm | 1 | 2 | 10000 | 10001 | 19998 |
| Iterative Algorithm | 1 | 2 | 3 | 4 | 4 |

(n = 10000)

*Fig. 7*
ITERATIVELY CALCULATING STANDARD DEVIATION FOR STREAMED DATA

CROSS-REFERENCE TO RELATED APPLICATIONS

This application is a continuation of and claims the benefit of and priority to U.S. patent application Ser. No. 13/711,624 entitled "Iteratively Calculating Standard Deviation For Streamed Data", filed Dec. 12, 2012 by Jizhu Lu, the entire contents of which are expressly incorporated by reference.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

As computer systems and computer networks continue to become more prolific, ever increasing amounts of data are carried between the computer systems over the computer networks. Many types of data are streamed from one computer system to another. Streaming data is data that is constantly being received by and presented to an end user while being delivered by a provider. Often this includes receiving similarly formatted data elements in succession separated by some time interval.

Processing streamed data can include performing calculations on multiple data elements. Thus, a computer system receiving a stream of data elements typically includes a buffer so that some number of data elements can be stored. Processing the streamed data elements can include accessing data elements stored in the buffer. When performing statistical calculations on streamed data elements, buffer requirements can be quite large. For example, when calculating standard deviation, a (potentially large) number of data elements may need to be accessed.

Further, some statistical calculations are recalculated as new streamed data elements are received. Thus, the (potentially large) number of data elements may need to be repeatedly accessed. For example, it may be that a standard deviation is used for a computation window that includes the last N data elements in a data stream. As such, every time a new data element is received, the new element is added to the computation window and the current $N^{th}$ data element is moved out of the computation window. The N data elements in the computation window are then accessed to recalculate the standard deviation.

As such, each data element remains in the computation window for N standard deviation calculations before it is aged out of the computation window. Accordingly, each data element is read from the buffer N times. Performing statistical calculations on streamed data elements in this way is time consuming and is an inefficient use of resources. For example, the computational complexity of calculating standard deviation in stream data is typically O(N).

BRIEF SUMMARY

The present invention extends to methods, systems, and computer program products for iteratively calculating standard deviation for streamed data. A computer system includes a buffer for storing streamed data elements. A buffer window length indicates a specified number of streamed data elements for filling computation windows for the buffer.

The computer system accesses streamed data elements for a computation window of the buffer. The streamed data elements include an earlier (and possibly initial) streamed data element and one or more additional streamed data elements. The earlier streamed data element was received prior to the one or more additional streamed data elements. The computer system calculates a standard deviation for the computation window from the earlier streamed element and one or more additional streamed elements.

The computer system receives a new streamed data element subsequent to receiving the one or more additional streamed data elements. The computer system stores the new streamed data element in the buffer. The computer system adjusts the computation window by: removing the earlier streamed data element from the computation window and adding the new streamed data element to the computation window.

The computer system iteratively calculates a next standard deviation for the adjusted computation window by reusing the standard deviation for the computation window. Calculating the next standard deviation includes accessing the new streamed data element from the buffer and accessing the standard deviation. Calculating the next standard deviation includes mathematically removing any contribution of the earlier streamed data element from the standard deviation. Calculating the next standard deviation includes mathematically adding a contribution of the new streamed data element to the standard deviation.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates an example computer architecture that facilitates iteratively calculating standard deviation for streamed data.

DETAILED DESCRIPTION

The present invention extends to methods, systems, and computer program products for iteratively calculating standard deviation for streamed data. A computer system includes a buffer for storing streamed data elements. A buffer window length indicates a specified number of streamed data elements for filling computation windows for the buffer.

The computer system accesses streamed data elements for a computation window of the buffer. The streamed data elements include an earlier (and possibly initial) streamed data element and one or more additional streamed data elements. The earlier streamed data element was received prior to the one or more additional streamed data elements. The computer system calculates a standard deviation for the computation window from the earlier streamed element and one or more additional streamed elements.

The computer system receives a new streamed data element subsequent to receiving the one or more additional streamed data elements. The computer system stores the new streamed data element in the buffer. The computer system adjusts the computation window by: removing the earlier streamed data element from the computation window and adding the new streamed data element to the computation window.

The computer system iteratively calculates a next standard deviation for the adjusted computation window by reusing the standard deviation for the computation window. Calculating the next standard deviation includes accessing the new streamed data element from the buffer and accessing the standard deviation. Calculating the next standard deviation includes mathematically removing any contribution of the earlier streamed data element from the standard deviation. Calculating the next standard deviation includes mathematically adding a contribution of the new streamed data element to the standard deviation.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, supercomputers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the claims, a "cloud computing environment" is an environment in which cloud computing is employed.

Within this description and the following claims, a "circular buffer" is a data structure that uses a single, fixed-size buffer as if it were connected end-to-end. A circular buffer can also be referred to as a cyclic buffer or a ring buffer.

Embodiments of the invention include iteratively calculating standard deviation in a current computation window based on the standard deviation calculation for a previous computation window. Iteratively calculating standard deviation avoids visiting all previous input and performing redundant computations thereby increasing calculation efficiency.

In general, streaming data is added to a buffer of size n until the buffer is filled up. Once the buffer is filled, a sum and standard deviation are calculated for the first n data points. As new data elements are received, a new sum is calculated by reusing the prior sum and a new standard deviation is calculated by reusing the prior standard deviation.

Figure 1:
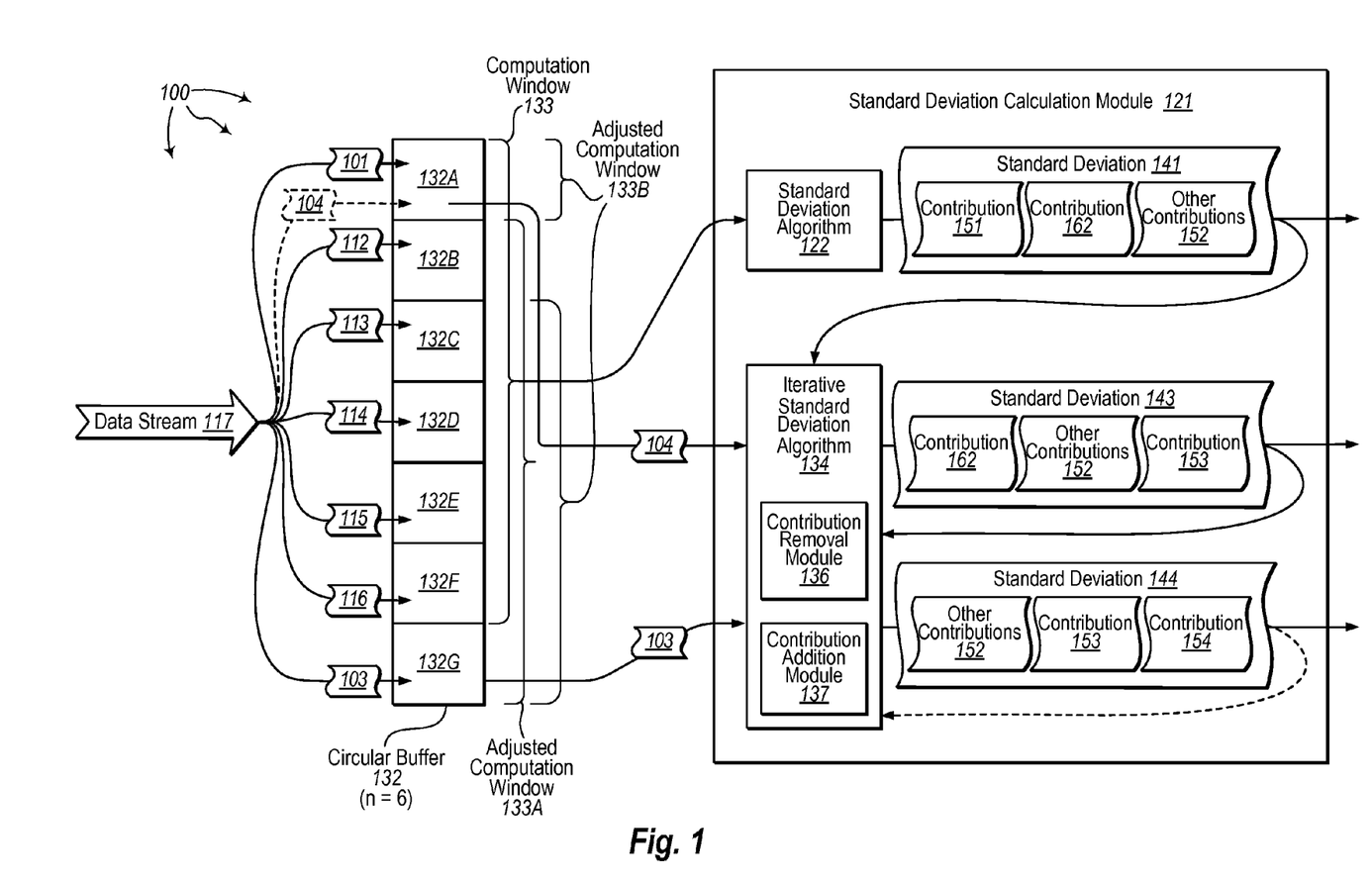

FIG. 1 illustrates an example computer architecture 100 that facilitates iteratively calculating standard deviation for streamed data. Referring to FIG. 1, computer architecture 100 includes standard deviation calculation module 121. Standard deviation calculation module 121 can be connected to (or is part of) a network, such as, for example, a Local Area Network ("LAN"), a Wide Area Network ("WAN"), and even the Internet. Accordingly, standard deviation calculation module 121 as well as any other connected computer systems and their components, can send and receive message related data (e.g., Internet Protocol ("IP") datagrams and other higher layer protocols that utilize IP datagrams, such as, User Datagram Protocol ("UDP"), Real-time Streaming Protocol ("RTSP"), Real-time Transport Protocol ("RTP"), Microsoft® Media Server ("MMS"), Transmission Control Protocol ("TCP"), Hypertext Transfer Protocol ("HTTP"), Simple Mail Transfer Protocol ("SMTP"), etc.) over the network.

In generally, data stream 117 can be a sequence of digitally encoded signals (e.g., packets of data or data packets) used to transmit or receive information that is in the process of being transmitted. Data stream 117 can stream data elements, such as, for example, stock quotes, video data, audio data, data collected by any sensors, closed-captioning data, real time text, etc., to computer architecture 100. Data stream 117 can be a live stream or can stream stored data.

As streamed data elements are received, the streamed data elements can be placed in a location within circular buffer 132. For example, data element 101 can be placed in location 132A, data element 112 can be placed in location 132B, data element 113 can be placed in location 132C, data element 114 can be placed in location 132D, data element 115 can be placed in location 132E, data element 116 can be placed in location 132F, data element 103 can be placed in location 132G.

Subsequently, data element 104 can be received. Data element 104 can be placed in location 132A (overwriting data element 101).

As depicted, circular buffer 132 has seven locations, 132A-132G and a computation window of six (i.e., n=6). Data elements within the computation window can rotate as new data elements are placed within circular buffer 132. For example, when data element 103 is placed in location 132G, computation window 133 and transition to computation window 133A. When data element 104 is subsequently placed in location 132A, computation window 103A can transition to computation 133B.

In general, standard deviation calculation module 121 is configured to calculate standard deviation for a set of data elements in a computation window. Standard deviation algorithm 122 is configured to calculate a standard deviation for data elements in a computation window. Standard deviation algorithm 122 receives a full set of data elements (e.g., 6) from a computation window as input. Standard deviation algorithm 122 calculates a standard deviation from the full set of data elements. Thus, each data element contributes to the calculated standard deviation. Standard deviation algorithm 122 can be used for an initial standard deviation calculation or when standard deviation calculations are reset.

Iterative standard deviation algorithm is also configured to calculate standard deviation for a set of data elements in a computation window. Iterative standard deviation algorithm 134 receives a prior standard deviation value and a most recent data element from a computation window as input. Iterative standard deviation algorithm 134 calculates a new standard deviation from the prior standard deviation value and the most recent data element. Contribution removal module 136 can remove a contribution for the least recent data element from the prior standard deviation. Contribution addition module 137 can add a contribution for the most recent data element to the prior standard deviation. Removing a contribution for the least recent data element along with adding a contribution for the most recent data element can be used to calculate standard deviation for the computation window.

Figure 2:
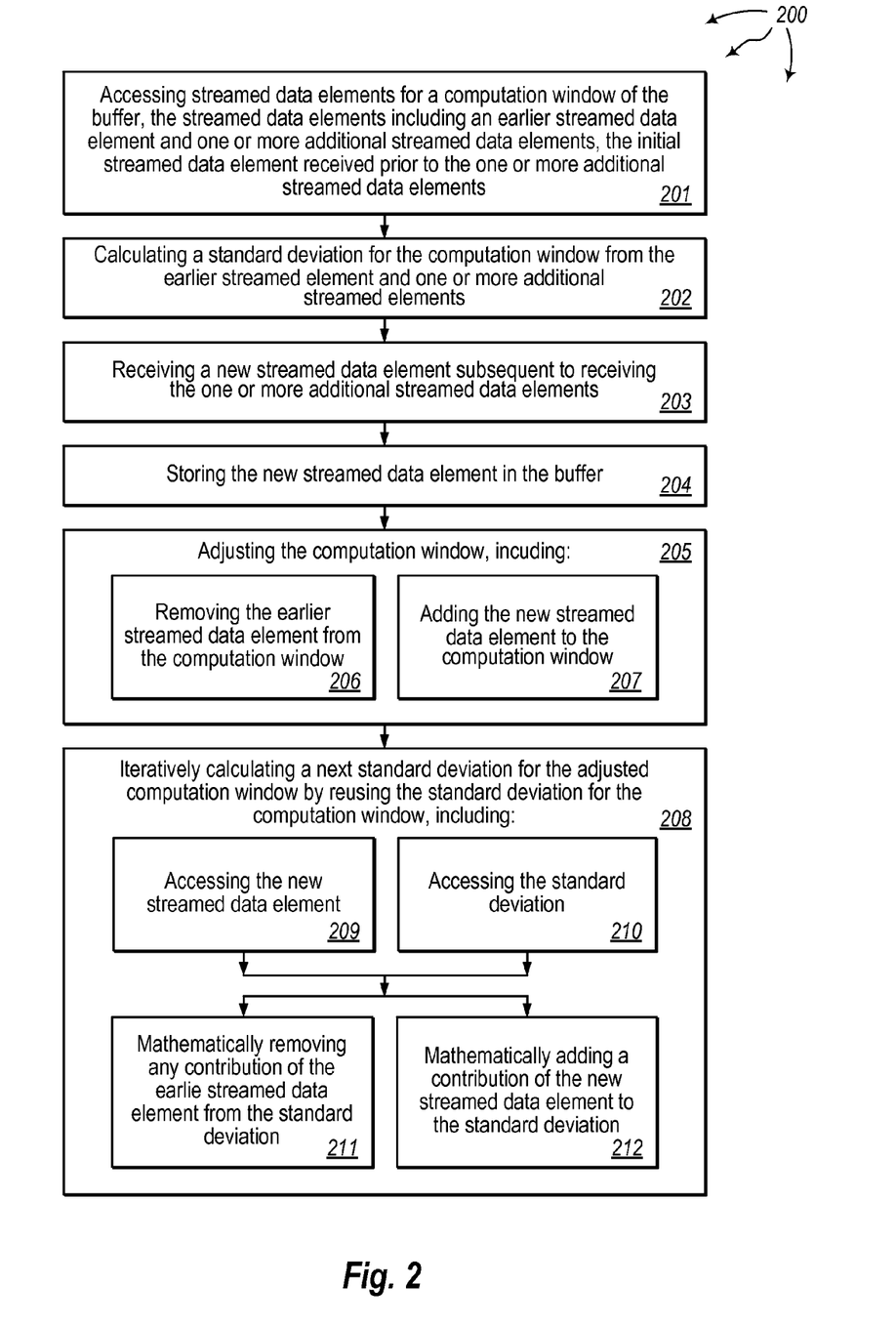
FIG. 2 illustrates a flow chart of an example method for iteratively calculating standard deviation for streamed data.

FIG. 2 illustrates a flow chart of an example method 200 for iteratively calculating standard deviation for streamed data. Method 200 will be described with respect to the components and data of computer architecture 100.

Method 200 includes accessing streamed data elements for a computation window of the buffer, the streamed data elements including an earlier streamed data element and one or more additional streamed data elements, the earlier streamed data element received prior to the one or more additional streamed data elements (201). For example, standard deviation calculation module can access data elements 101, 112, 113, 114, 115, and 116 for computation window 133 of buffer 132. Data element 101 can be the earlier (and potentially initially) streamed element and data elements 112, 113, 114, 115, and 116 can be the one or more additional elements. Data element 101 can be received prior to data elements 112, 113, 114, 115, and 116.

Method 200 includes calculating a standard deviation for the computation window from the earlier streamed element and one or more additional streamed elements (202). For example, standard deviation algorithm 122 can be used to calculate standard deviation 141 from data element 101 and data elements 112, 113, 114, 115, and 116. As depicted, standard deviation includes contribution 151, contribution 162, and other contributions 152. Contribution 151 is a contribution from data element 101 to standard deviation 141. Contribution 162 is a contribution from data element 112 to standard deviation 141. Other contributions 152 are contributions from data elements 113, 114, 115, and 116 to standard deviation 141.

Method 200 includes receiving a new streamed data element subsequent to receiving the one or more additional streamed data elements (203). For example, data element 103 can be received subsequent to receiving data elements 112-116. Method 200 includes storing the new streamed data element in the buffer (204). For example, data element 103 can be stored in location 132G of buffer 132.

Method 200 includes adjusting the computation window (205). For example, computation window 133 can be transitioned to computation window 132A. Adjusting the computation window includes removing the earlier streamed data element from the computation window (206) and adding the new streamed data element to the computation window (207). For example, data element 101 is removed from computation window 133A and data element 103 is added to computation window 133A.

Method 200 includes iteratively calculating a next standard deviation for the adjusted computation window by reusing the standard deviation for the computation window (208). For example, iterative standard deviation algorithm 134 can be used to calculate standard deviation 143 (for computation window 133A) by reusing standard deviation 141 (for computation window 133).

Iteratively calculating a next standard deviation includes accessing the new streamed data element (209). For example, iterative standard deviation algorithm 134 can access data element 103. Iteratively calculating a next standard deviation includes accessing the standard deviation (210). For example, iterative standard deviation algorithm 134 can access standard deviation 141.

Iteratively calculating a next standard deviation includes mathematically removing any contribution of the earlier streamed data element from the standard deviation (211). For example, iteratively calculating standard deviation 143 can include contribution removal module 136 mathematically removing contribution 151 (i.e., the contribution from data element 101) from standard deviation 141. Iteratively calculating a next standard deviation includes mathematically adding a contribution of the new streamed data element to the standard deviation (212). For example, iteratively calculating standard deviation 143 can include contribution addition module 137 mathematically adding contribution 153 to standard deviation 141. Contribution 153 is a contribution from data element 103.

Iterative standard deviation algorithm 134 can then output standard deviation 143. As depicted, standard deviation 143 includes contribution 162 (a contribution from data element 112), other contributions 152 (contributions from data elements 113-116), and contribution 153 (a contribution from data element 103).

203-212 can repeated as newer steamed data elements are received. For example, subsequent to calculating standard deviation 143, date element 104 can be received. Data element 104 can be placed in location 132A overwriting data element 101. Computation window 132A can be transitioned to computation window 132B by removing data element 112 and adding data element 104.

Iterative standard deviation algorithm 134 can be used to calculate standard deviation 144 (for computation window 133B) by reusing standard deviation 143 (for computation window 133A). Iterative standard deviation algorithm 134 can access data element 104. Iterative standard deviation algorithm 134 can access standard deviation 143. Iteratively calculating standard deviation 144 can include contribution removal module 136 mathematically removing contribution 162 (i.e., the contribution from data element 112) from standard deviation 143. Iteratively calculating standard deviation 144 can include contribution addition module 137 mathematically adding contribution 154 to standard deviation 143. Contribution 154 is a contribution from data element 104.

Iterative standard deviation algorithm 134 can then output standard deviation 144. As depicted, standard deviation 144 includes other contributions 152 (contributions for data elements 113-116), contribution 153 (a contribution from data element 103), and contribution 154 (a contribution from data element 104).

When a next new streaming data element is received, standard deviation 144 can be used to iteratively calculate a next standard deviation.

Figure 3:
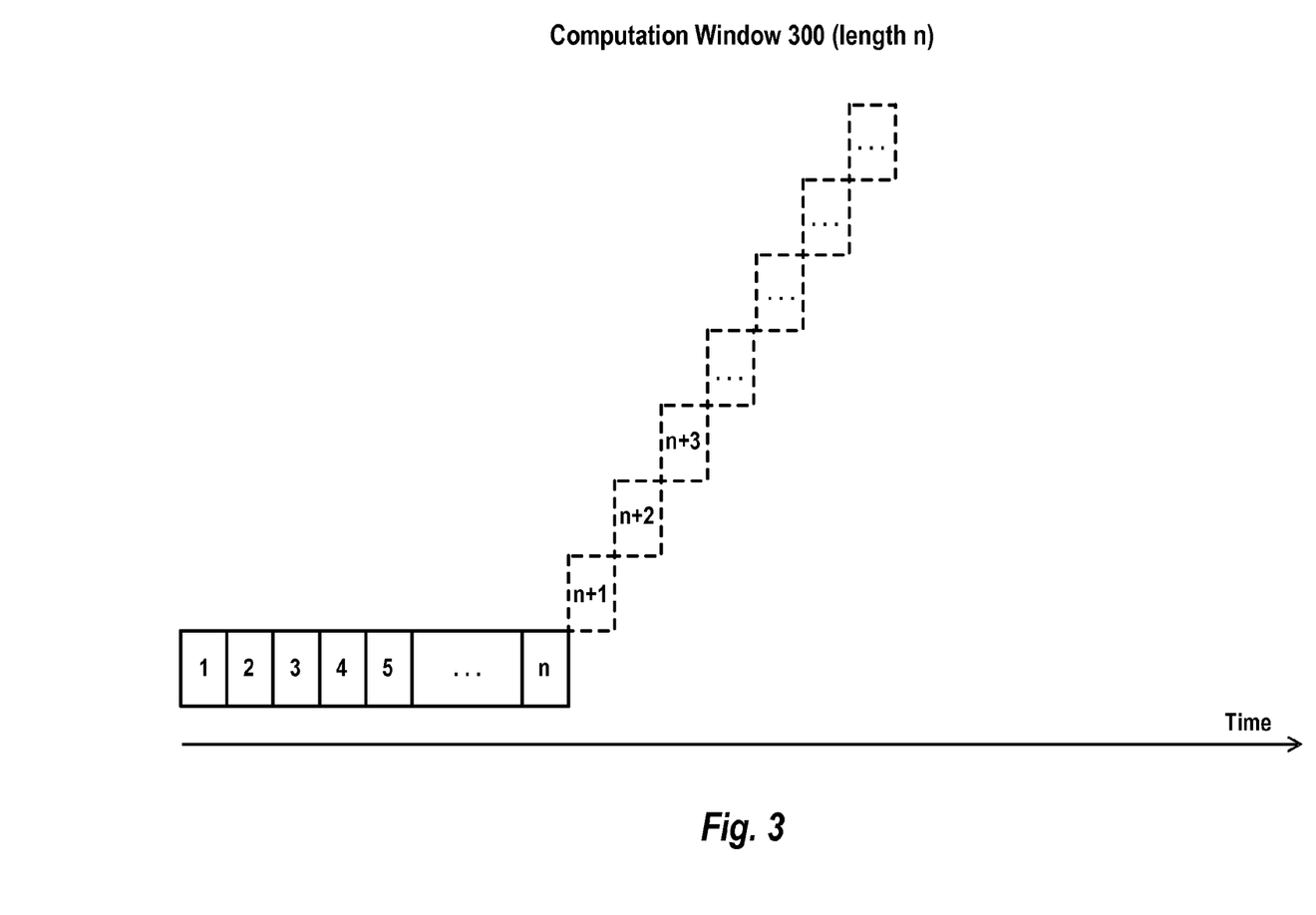
FIG. 3 illustrates data that is accessed from a computation window to calculate a standard deviation.

FIG. 3 illustrates data that is accessed from a computation window 300 to calculate a standard deviation. For computation window 300, the first n data elements are accessed to calculate a standard deviation for the first window. As time progresses, individual new streamed data elements, for example, n+1, then n+2, then n+3, etc., are accessed to iteratively calculate next standard deviations. Standard deviations can be iteratively calculated from two time points, two variables containing the sum of a current time window and previous window, and the standard deviation for the previous window. Thus, after calculation of the standard deviation for the first window, computation complexity is reduced to O(1) and remains constant. As n increases the reduction in computation workload becomes more substantial.

Figure 4A:
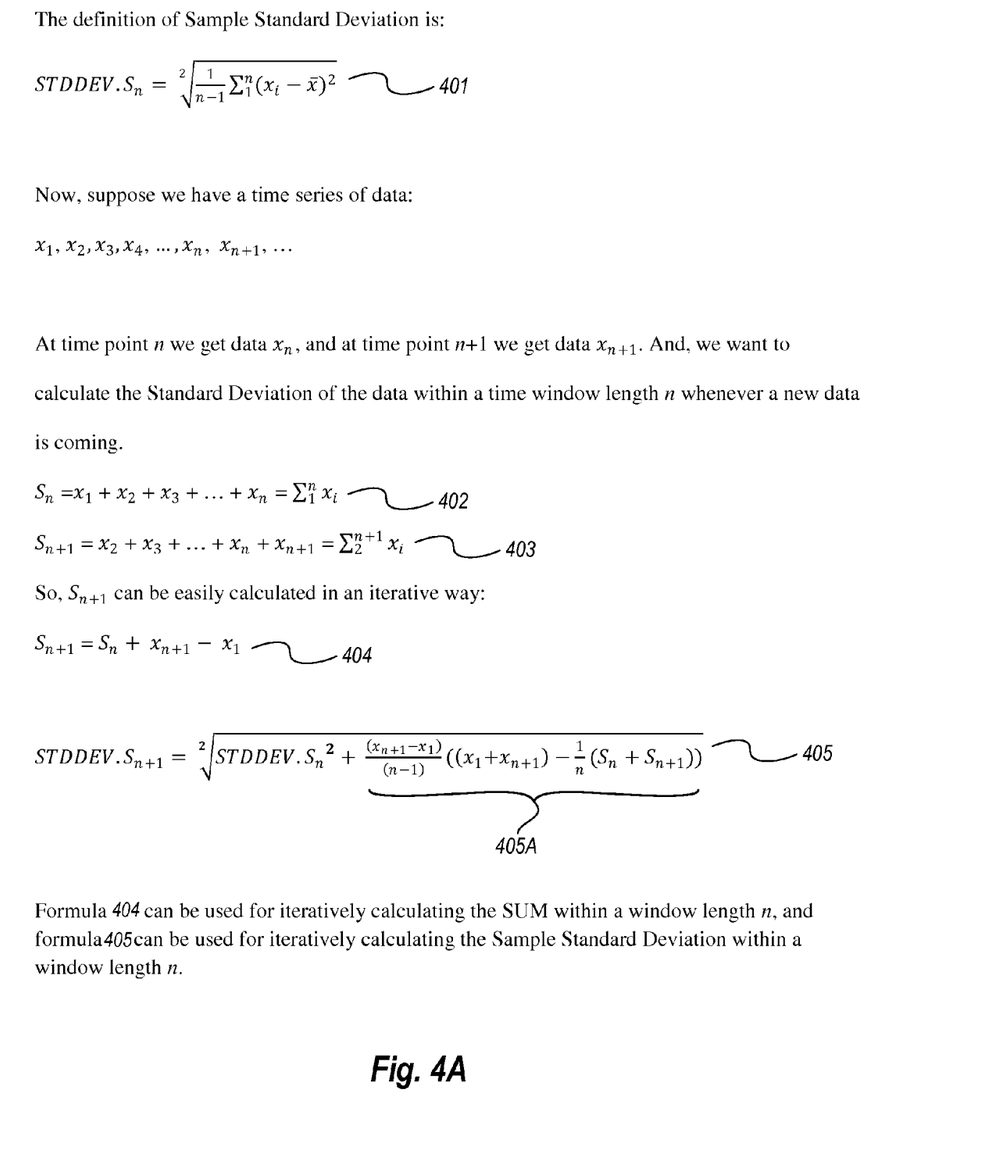
FIG. 4A illustrates equations for iteratively calculating a sample standard deviation.

FIG. 4A illustrates equations for iteratively calculating a sample standard deviation. Formula 401 is a traditional equation for calculation sample standard deviation. Formula 402 depicts a SUM for $S_n$ and formula 403 depicts a SUM for $S_{n+1}$. Formula 404 depicts a SUM for $S_n$ relative to the SUM for $S_n$.

Formula 405 is an equation for iteratively calculating a sample standard deviation for n+1 when the sample standard deviation for n is known. Collectively, formula portion 405A removes a contribution from an earlier data element (e.g., $x_1$) and adds a contribution for a newer element (e.g., $x_{n+1}$) to a prior standard deviation.

Figure 4B:
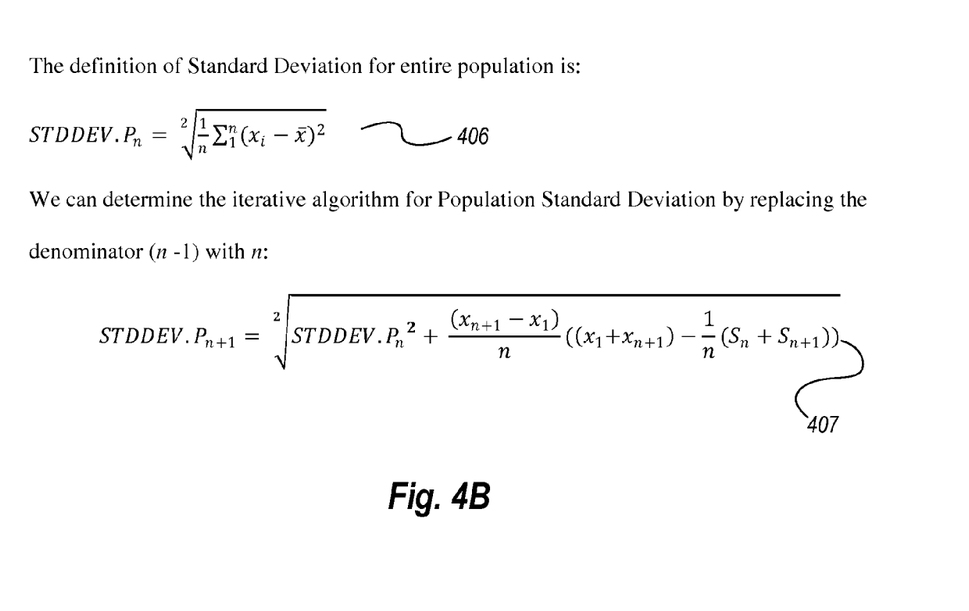
FIG. 4B illustrates an equation for iteratively calculating a population standard deviation.

FIG. 4B illustrates an equation for iteratively calculating a population standard deviation. Formula 406 is a traditional equation for calculating population standard deviation. Formula 407 is an equation for iteratively calculating population standard deviation for n+1 when the standard deviation for n is known.

Figure 5A:
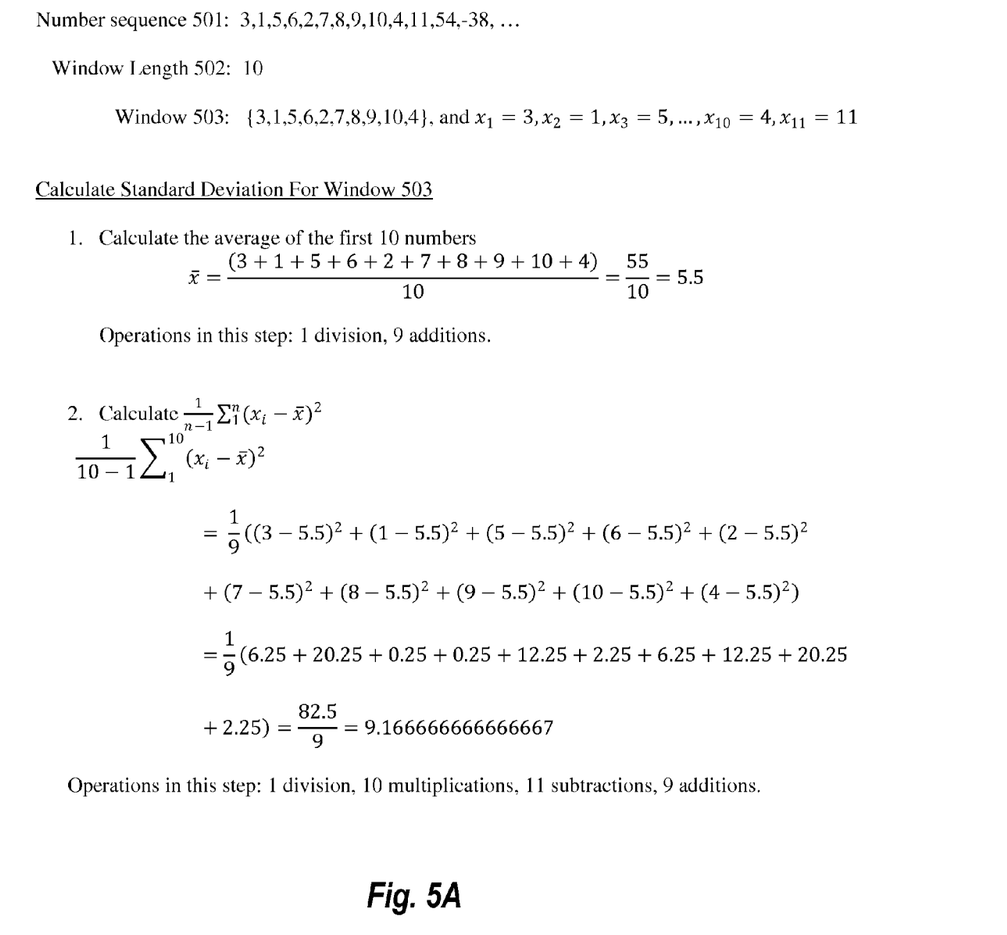
FIG. 5A illustrates an example of calculating standard deviation using traditional algorithms.

FIG. 5A illustrates an example of calculating sample standard deviation for number sequence 501 using traditional algorithms. Window length 502 (n) is 10. Windows 503 includes the first ten elements in number sequence 501. For each window, an average is calculated, the summation element is calculated, and the square root operation is applied to calculate the sample standard deviation.

For example, for window 503 the average is calculated to be 5.5. Calculating the average includes 1 division operation and 9 addition operations. Using the average, the summation element is calculated to be ~9.1666667. Calculating the summation element includes 1 division, 10 multiplications, 11 subtractions, and 9 additions. The square root operation is application to calculate the standard deviation. Thus, the total number of operations includes 1 square root, 2 divisions, 10 multiplications, 10 subtractions, and 18 additions.

The same formulas can be used to calculate sample standard deviation for windows 504 and 505. Each of these calculations also includes 1 square root, 2 divisions, 10 multiplications, 10 subtractions, and 18 additions.

Figure 5B:
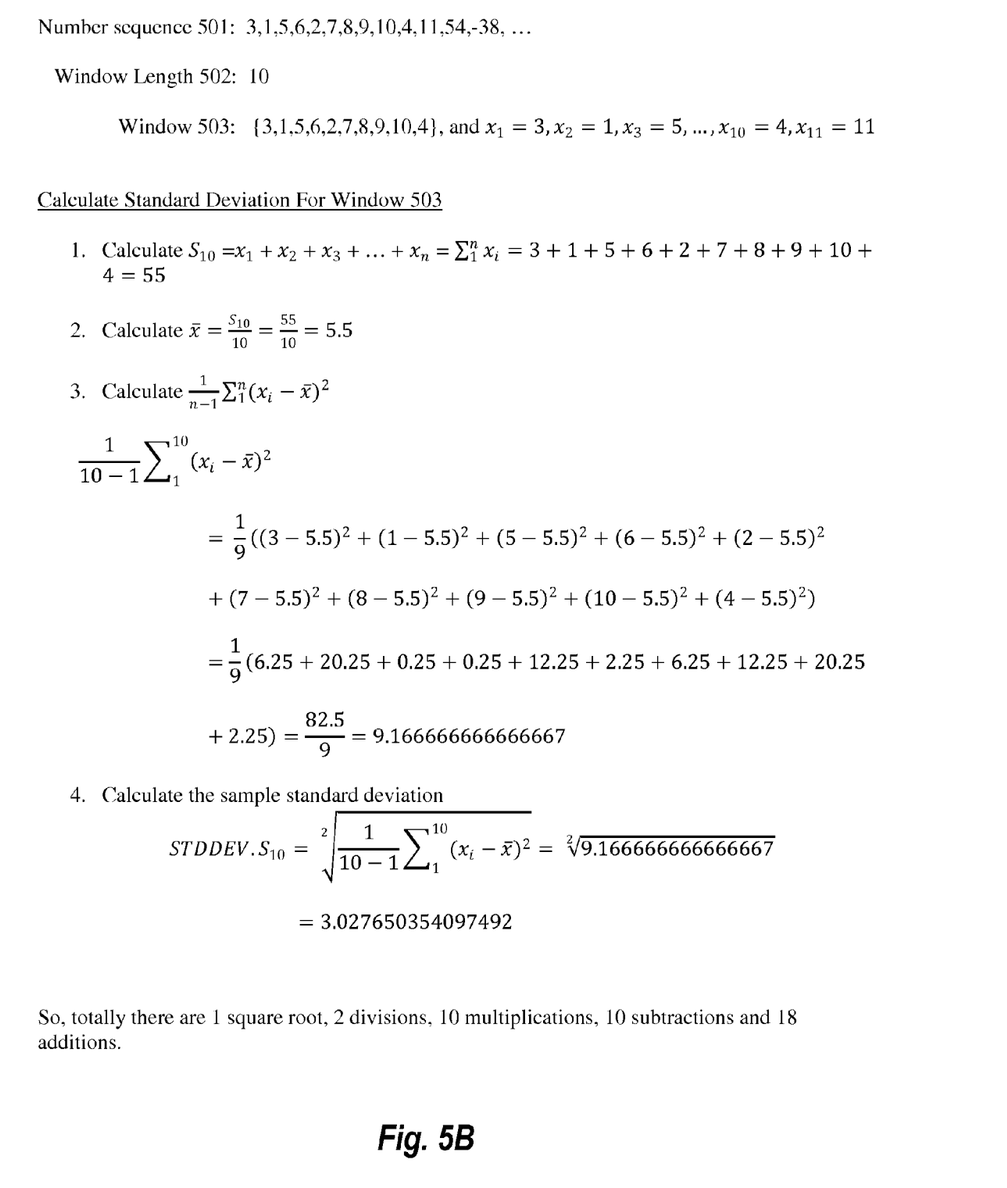
FIG. 5B illustrates an example of calculating standard deviation using iterative algorithms.

FIG. 5B illustrates an example of calculating sample standard deviation using iterative algorithms. The calculations for window 503 are essentially the same as FIG. 5A. Thus, the total number of operations includes 1 square root, 2 divisions, 10 multiplications, 10 subtractions, and 18 additions.

However, for window 504, formulas 404 and 405 can be used iteratively calculate the standard deviation for window 504 from the standard deviation for window 503. Formula 404 can be used to calculate $S_{11}$. Formula 404 includes 1 addition and 1 subtraction. Formula 405 can then be used to calculate the sample standard deviation. Formula 405 includes 1 square root, 2 divisions, 3 multiplications, 3 subtractions, and 3 additions. Thus, the total operations include 1 square root, 2 divisions, 3 multiplications, 4 subtractions, and 4 additions.

Formulas 404 and 405 can also be used to iteratively calculate the sample standard deviation for window 505 from the sample standard deviation for window 504. These calculations also include 1 square root, 2 divisions, 3 multiplications, 4 subtractions, and 4 additions. As such, the number of operations used when iteratively calculating standard deviation is (potentially substantially) less than when using traditional formulas.

Similar calculations for population standard deviation can also be demonstrated.

Figure 6:
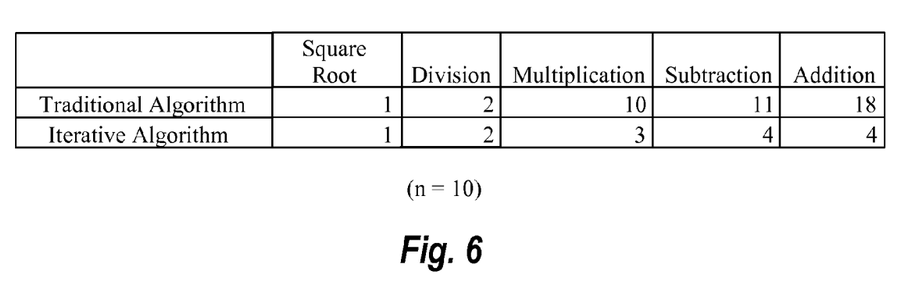
FIG. 6 illustrates computational loads for traditional standard deviation algorithms and iterative standard deviation algorithms.

FIG. 6 illustrates computational loads for traditional standard deviation algorithm and iterative standard deviation algorithm for n=10. As depicted, there are fewer multiplication operations, fewer subtraction operations, and fewer addition operations using an iterative algorithm.

Figure 7:
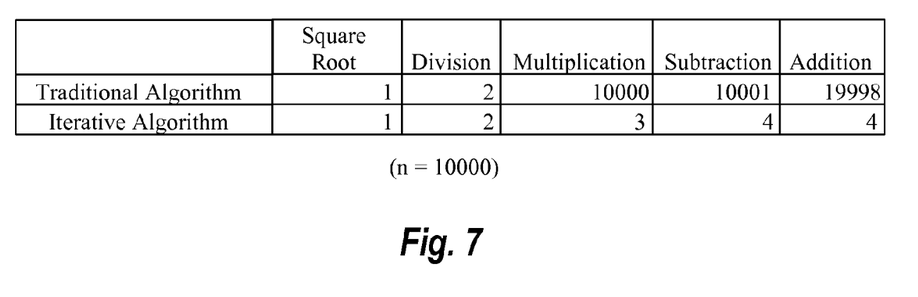
FIG. 7 illustrates computational loads for traditional standard deviation algorithms and iterative standard deviation algorithms.

FIG. 7 illustrates computational loads for traditional standard deviation algorithm and iterative standard deviation algorithm for n=10000. As depicted, there are substantially fewer multiplication operations, fewer subtraction operations, and fewer addition operations using an iterative algorithm.

Similar differences in computational loads can be demonstrated for population standard deviation as well.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for use at a computer system, the computer system including one or more processors and system memory, the computer system having a computation window in the system memory for storing streamed data elements, the method for calculating standard deviation for streamed data elements in the computation window, the method comprising the one or more processors:

calculating a standard deviation for data elements streamed from a data stream into the computation window, the standard deviation based on a streamed data element and one or more additional streamed data elements contained in the computation window, the streamed data element and the one or more streamed data elements streamed from the data stream into the computation window;

receiving a new streamed data element from the data stream for inclusion in the computation window;

adjusting streamed data elements contained in the computation window by adding the new streamed data element to the computation window and removing the streamed data element from the computation window; and iteratively calculating a further standard deviation based on the adjusted streamed data elements contained in the computation window by adjusting the standard deviation in view of adding the new streamed element to the computation window and removing the streamed data element from the computation window.

2. The method claim 1, further comprising accessing the streamed data element and the one or more additional streamed data elements from the data stream.

3. The method of claim 2, wherein accessing the streamed data element and one or more additional streamed data elements from a data stream comprises accessing the streamed data element and one or more additional streamed data elements from a data stream, the data stream including one or more of: stock quotes, audio data, video data, data collected by any sensors, or closed captioning data.

4. The method of claim 1, wherein calculating a standard deviation comprises calculating a sample standard deviation for the data elements streamed from the data stream into computation window.

5. The method of claim 1, wherein calculating a standard deviation comprises calculating a population standard deviation for the data elements streamed from the data stream into computation window.

6. The method of claim 1, wherein iteratively calculating a further standard deviation comprises adding a value for the new streamed data element to a sum of values for the computation window and subtracting a value for the streamed data element from the sum of values for the computation window.

7. The method of claim 1, wherein the computation window is a circular buffer.

8. A computer program product for use at a computer system, the computer system having a computation window in system memory for storing streamed data elements, the computer program product for implementing a method for calculating standard deviation for streamed data elements in the computation window, the computer program product comprising one or more computer storage devices having stored thereon computer-executable instructions that, when executed at a processor, cause the computer system to perform the method, including the following:

calculate a standard deviation for data elements streamed from a data stream into the computation window, the standard deviation based on a streamed data element and one or more additional streamed data elements contained in the computation window, the streamed data element and the one or more streamed data elements streamed from the data stream into the computation window;

receive a new streamed data element from the data stream for inclusion in the computation window;

adjust streamed data elements contained in the computation window by adding the new streamed data element to the computation window and removing the streamed data element from the computation window; and iteratively calculate a further standard deviation based on the adjusted streamed data elements contained in the computation window by adjusting the standard deviation in view of adding the new streamed element to the computation window and removing the streamed data element from the computation window.

9. The computer program product of claim 8, further comprising computer-executable instructions that, when executed, cause the computer system to:

access the streamed data element and the one or more additional streamed data elements from the data stream; and store the streamed data element and the one or more additional streamed data elements in the computation window.

10. The computer program product of claim 9, wherein computer-executable instructions that, when executed, cause the computer system to access the streamed data element and the one or more additional streamed data elements from a data stream comprising computer-executable instructions that, when executed, cause the computer system to access the streamed data element and one or more additional streamed data elements from a data stream, the data stream including one or more of: stock quotes, audio data, video data, data collected by any sensors, or closed captioning data.

11. The computer program product of claim 9, wherein computer-executable instructions that, when executed, cause the computer system to store the streamed data element and the one or more additional streamed data elements in the computation window comprise executable instructions that, when executed, cause the computer system to store the streamed data element and the one or more additional streamed data elements in a circular buffer.

12. The computer program product of claim 8, wherein computer-executable instructions that, when executed, cause the computer system to iteratively calculate a further standard deviation comprise computer-executable instructions that, when executed, cause the computer system to calculate a sample standard deviation.

13. The computer program product of claim 8, wherein computer-executable instructions that, when executed, cause the computer system to iteratively calculate a further standard deviation comprise computer-executable instructions that, when executed, cause the computer system to calculate a population standard deviation.

14. A computer system, the computer system comprising:
one or more processors;
system memory coupled to the one or more processors;
a computation window in the system memory for storing streamed data elements; and
the one or more processors configured to execute computer-executable instructions to:

calculate a standard deviation for data elements streamed from a data stream into the computation window, the standard deviation based on a streamed data element and one or more additional streamed data elements contained in the computation window, the streamed data element and the one or more streamed data elements streamed from the data stream into the computation window;

receive a new streamed data element from the data stream for inclusion in the computation window;

adjust streamed data elements contained in the computation window by adding the new streamed data element to the computation window and removing the streamed data element from the computation window; and iteratively calculate a further standard deviation based on the adjusted streamed data elements contained in the computation window by adjusting the standard deviation in view of adding the new streamed element to the computation window and removing the streamed data element from the computation window.

15. The computer system of claim 14, further comprising the one or more processors configured to execute computer-executable instructions to:

access the streamed data element and the one or more additional streamed data elements from the data stream; and store the streamed data element and the one or more additional streamed data elements in the computation window.

16. The computer system of claim 15, wherein the one or more processors configured to execute computer-executable instructions to access the streamed data element and the one or more additional streamed data elements from a data stream comprise the one or more processors configured to execute computer-executable instructions to access the streamed data element and the one or more additional streamed data elements from a data stream, the data stream including one or more of: stock quotes, audio data, video data, data collected by any sensors, or closed captioning data.

17. The computer system of claim 15, wherein the one or more processors configured to execute computer-executable instructions to calculate a standard deviation from values in computation window comprise the one or more processors configured to execute computer-executable instructions to calculate one of: a sample standard deviation from values in the computation window or a population standard deviation from values in the computation window.

18. The computer system of claim 15, wherein the one or more processors configured to execute computer-executable instructions to iteratively calculate a further standard deviation comprise the one or more processors configured to execute computer-executable instructions to add a value for the new streamed data element to a sum of values for streamed data elements in the computation window and subtracting a value for the streamed element from the sum of values for streamed data elements in the computation window.

19. The computer system of claim 15, wherein the one or more processors configured to execute computer-executable instructions to iteratively calculate a next standard deviation comprise the one or more processors configured to execute computer-executable instructions to calculate one of: a sample standard deviation and a population standard deviation.

20. The computer system of claim 15, wherein the one or more additional streamed data elements include a closest streamed data element closest in time to the streamed data element, further comprising the one or more processors configured to execute computer-executable instructions to:
  receive a further new streamed data element subsequent to receiving the new streamed element;
  store the further new streamed data element in the computation window;
  adjust the contents of the computation window, including:
    remove the closest streamed data element from the computation window; and
    add the further new streamed data element to the computation window;
  iteratively calculate an additional standard deviation by reusing the further standard deviation, including:
    access the further new streamed data element;
    access the further standard deviation;
    mathematically remove any contribution of the closest streamed data element from the further standard deviation; and
    mathematically add a contribution of the further new streamed data element to the further standard deviation.

* * * * *